(12) United States Patent
Yamamoto

(10) Patent No.: US 7,708,465 B2
(45) Date of Patent: May 4, 2010

(54) HYDRODYNAMIC BEARING DEVICE, SPINDLE MOTOR, AND METHOD FOR MANUFACTURING HYDRODYNAMIC BEARING DEVICE

(75) Inventor: Takeyoshi Yamamoto, Niihama (JP)

(73) Assignee: Panasonic Corporation, Osaka (JP)

( * ) Notice: Subject to any disclaimer, the term of this patent is extended or adjusted under 35 U.S.C. 154(b) by 1220 days.

(21) Appl. No.: 11/261,469

(22) Filed: Oct. 31, 2005

(65) Prior Publication Data

US 2006/0104554 A1 May 18, 2006

(30) Foreign Application Priority Data

Nov. 18, 2004 (JP) .............................. 2004-333809

(51) Int. Cl.
*F16C 33/10* (2006.01)
(52) U.S. Cl. .................. 384/114; 384/625; 384/907
(58) Field of Classification Search ................. 384/107, 384/114, 625, 907
See application file for complete search history.

(56) References Cited

U.S. PATENT DOCUMENTS 6,341,896 B1 * 1/2002 Miura et al. ................ 384/115

FOREIGN PATENT DOCUMENTS

| JP | 2002161371 A | 6/2002 |
|----|--------------|--------|
| JP | 2002188638 A | 7/2002 |
| JP | 2002357223 A | 12/2002 |

* cited by examiner

*Primary Examiner*—William C Joyce
(74) *Attorney, Agent, or Firm*—Steptoe & Johnson LLP

(57) ABSTRACT

Highly reliable hydrodynamic bearing device and spindle motor are provided as a result of improving cleanliness by using an iron metal having austenite structure, which is a non-magnetic body, and solving the problem of lowering of abrasion resistance due to low hardness. A shaft is formed using an iron metal having austenite structure, and a surface treated layer dispersed with solid lubricant is formed on at least a part of the surface of a shaft facing a sleeve by spraying fine particles of solid lubricant. Cleanliness is improved since the shaft is formed using an iron metal having austenite structure, which is a non-magnetic body. Further, since the surface treated layer dispersed with solid lubricant is arranged on the bearing surface, the abrasion resistance is enhanced and excellent bearing reliability is obtained.

11 Claims, 3 Drawing Sheets

COLD WORKING RATE-HARDNESS CORRELATION DIAGRAM

SURFACE HARDNESS-SURFACE ROUGHNESS CORRELATION DIAGRAM

SURFACE HARDNESS-SURFACE ROUGHNESS CORRELATION DIAGRAM

SURFACE ROUGHNESS-REMAINING PARTICLE CORRELATION DIAGRAM

SURFACE ROUGHNESS-BEARING SERVICE LIFE CORRELATION DIAGRAM

HYDRODYNAMIC BEARING DEVICE, SPINDLE MOTOR, AND METHOD FOR MANUFACTURING HYDRODYNAMIC BEARING DEVICE

BACKGROUND OF THE INVENTION

1. Field of the Invention

The present invention relates to a hydrodynamic bearing device that uses a dynamic pressure bearing, a spindle motor including the hydrodynamic bearing device, and a method for manufacturing the hydrodynamic bearing device.

2. Description of the Related Art

In place of a ball bearing device conventionally used, a hydrodynamic bearing device that excels in rotation precision and that excels in sound silence in comparison with ball bearing is being widely used as a bearing device used in a spindle motor of a hard disc, a polygon mirror, an optical disc device or the like.

In the hard disc or the like that uses such hydrodynamic bearing device, improvement in recording density or enhancement in long-term reliability is advancing, and accompanied therewith, cleanliness demanded for the components is becoming extremely strict. However, since the martensitic stainless which is the bearing member currently being used commonly is a magnetic material, dust is likely to attach thereto, and further improvement in cleanliness is becoming difficult. Thus, improving cleanliness by using an iron metal having an austenite structure such as austenite stainless or austenite high strength steel which is a non-magnetic body is being reviewed.

However, although the conventional martensitic stainless obtains a hardness of about HRc (Rockwell hardness) 56 by hardening, the iron metal having austenite structure has a hardness of about HRc 10 to 25 as it cannot be hardened, and thus when used in such state, the abrasion of the bearing surface advances. When the bearing surface is abraded, rotation abnormality or, in the worst case, a lock of the bearing occurs, thereby greatly lowering the reliability of the hydrodynamic bearing device, and thus the austenite stainless cannot be used as it is.

In order to address the above problems, in the hydrodynamic bearing device disclosed in JP-A 2002-188638, a nitriding process is performed on a shaft made of austenite stainless steel to improve the surface hardness. For instance, after making the SUS 303, which is an austenite stainless steel, to a required shape through cutting, a dynamic pressure groove is formed through plastic forming. Subsequently, finish machining is performed by polishing, and surface effect process is performed by nitriding process of (1) salt bath nitriding, (2) ion nitriding, (3) gas nitrocarburizing and the like to fabricate the shaft.

In a slide bearing device disclosed in JP-A 2002-357223, an excellent abrasion resistance property is obtained by forming a DLC (Diamond Like Carbon) coating on the bearing surface.

Further, in JP-A 2002-161371, the lubricating property is enhanced by spraying injection fine particle in which the fine particles of a metal constituting the parent phase and the fine particles of a solid lubricant are mixed, and forming a coated layer in which the solid lubricant is dispersed in the parent phase. For example, the fine particles are sprayed on the shaft with collar made of heat-resistant stainless steel (SUS 304) used in HDD (Hard Disc Drive) spindle motor to form the lubricating coated layer.

However, in the hydrodynamic bearing device of the conventional configuration disclosed in JP-A 2002-188638, surface roughness involved in nitriding process occurs, and when used directly after the nitriding process, problems such as mixture (contamination) due to cleaning failure, or advancement of abrasion of the bearing surface arise. Further, since the nitriding process requires a vacuum device, the manufacturing cost increases.

In the slide bearing device of the conventional configuration disclosed in JP-A 2002-357223, as the stripping strength of the DLC is low, the DLC is stripped when a momentary high stress is applied thereby causing the bearing surfaces to contact each other by way of the DLC and locking the bearing. Further, since the nitriding process requires a vacuum device, similar to above, the manufacturing cost increases.

In the lubricating coated layer of the conventional configuration disclosed in JP-A 2002-161371, as the metal constituting the parent phase is a soft metal, the abrasion of the surface easily advances. Further, since the fine particles of soft metal constituting the parent phase and the fine particles of the solid lubricating material are mixed and sprayed, in the last half of spraying in which the surface is formed, the solid lubricating material is sprayed on the soft metal layer, and thus the surface roughness roughens. As described in the patent document, in the hydrodynamic bearing in which the operating fluid is gas, micro-dimples are sometimes effective, but in the hydrodynamic bearing in which the operating fluid is liquid, mixture (contamination) problem arises due to cleaning failure or problem of advancement of abrasion of the bearing surface.

SUMMARY OF THE INVENTION

The present invention, in view of solving the above problems, aims to provide a hydrodynamic bearing device having high reliability that improves cleanliness using an iron metal having austenite structure, which is a non-magnetic body, and that solves the problem of the lowering of abrasion resistance due to low hardness. The invention also aims to provide a spindle motor having the hydrodynamic bearing device, and a method for manufacturing the hydrodynamic bearing device.

In order to solve the above problems, the hydrodynamic bearing device of the present invention is a hydrodynamic bearing device comprising a shaft, a sleeve arranged on an outer periphery of the shaft with a micro-gap therebetween, a dynamic pressure generating groove formed on at least one of the opposing surfaces of the shaft and the sleeve, and a liquid operation fluid being filled in between the shaft and the sleeve, wherein the shaft is formed using an iron metal having austenite structure, and a surface treated layer of solid lubricant is formed on at least a part of the surface of the shaft facing the sleeve.

In the hydrodynamic bearing device of the present invention, the iron metal having austenite structure has surface hardness of equal to or more than HRc 30.

According to the present invention, cleanliness is improved as the shaft is made of iron metal having austenite structure, which is a nonmagnetic body. Further, as the bearing surface includes a surface treated layer of solid lubricant, abrasion resistance is enhanced and a satisfactory bearing reliability is obtained. By obtaining the surface treated layer by spraying fine particles of solid lubricant on the iron metal having austenite structure with surface hardness of equal to or more than HRc 30, micro-dimples become small, cleanliness is further improved, and abrasion of the bearing surface is reduced.

The present invention is applicable to a hydrodynamic bearing device particularly suited to a spindle motor of a hard disc device and other devices, but may also be applied to other apparatuses and has industrial applicability.

DESCRIPTION OF THE PREFERRED EMBODIMENTS

A hydrodynamic bearing device and a spindle motor including the hydrodynamic bearing device according to the preferred embodiments of the present invention will now be described with reference to the drawings.

First Embodiment

Figure 1:
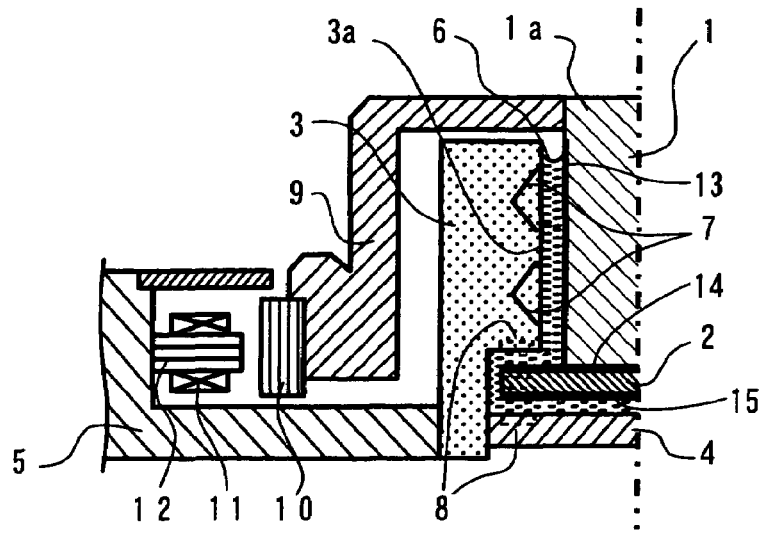
FIG. 1 is a cross sectional view of a spindle motor including a hydrodynamic bearing device according to a first embodiment of the present invention.

As shown in FIG. 1, the hydrodynamic bearing device of the spindle motor includes a shaft 1, a thrust flange 2 projecting from the shaft 1 outward in the radial direction, a sleeve 3 arranged on the outer periphery with respect to the shaft 1 with a micro-gap in between, and a thrust plate 4 arranged at a position facing the thrust flange 2 with a micro-gap in between.

The sleeve 3 is fixed to a base 5 of the spindle motor, and an inserting hole 3a is formed at the center. The shaft 1 is inserted into the inserting hole 3a at an orientation creating the micro-gap, and a liquid lubricating oil 6 serving as operating fluid is filled into the micro-gap between the shaft 1 and the sleeve 3. Further, the thrust flange 2 is attached at the far end of the shaft 1 so as to be integrally fixed by a screw, an external fitting coupling and the like. The thrust plate 4 is arranged so as to face the circular plane of the thrust flange 2 and is fixed to the sleeve 3. The liquid lubricating oil 6 is filled in the gap between the thrust flange 2 and the thrust plate 4. A radial dynamic pressure generating groove 7 of a spiral shape or a herringbone shape is formed on the outer periphery of the shaft 1 or the inner circumferential surface of the sleeve 3 through form rolling, etching, electrochemical machining and the like. In this embodiment, the radial bearing made of the radial dynamic pressure groove 7 are arranged on each of the two locations of a region closer to the back side and the region closer to the opening side of the inner circumferential surface of the sleeve 3.

A thrust dynamic pressure generating groove 8 of a spiral shape or a herringbone shape is formed on at least one surface of the opposing surfaces of the thrust flange 2 and the thrust plate 4 to configure a thrust-bearing. Further, the thrust dynamic pressure generating groove 8 is formed on at least one of the surfaces of the thrust flange 2 adjacent to the far end of the shaft 1 and the surface of the sleeve 3 facing such surface of the thrust flange 2 to configure the thrust bearing. It is to be noted that in FIG. 1, a case in which the thrust dynamic pressure generating groove 8 is formed on each of the surface of the sleeve 3 and the surface of the thrust plate 4 facing the thrust flange 2 is shown.

A hub 9 serving as a rotating member, on the outer periphery of which is fixed with a magnetic recording disc and the like, is externally fitted in a press fit state to the projecting end 1a of the shaft 1 projecting from the opening of the sleeve 3. In this embodiment, a rotor magnet 10 is attached to the outer periphery of the part closer to the base of the hub 9. Further, a stator core 12 wounded with a stator coil 11 is attached to the base 5 so as to face the rotor magnet 10. The rotor magnet 10 and the stator core 12 configure a driving unit of the spindle motor for applying a rotation driving force to between the shaft 1 and the sleeve 3.

When the hub 9, the shaft 1 and the thrust flange 2 are rotated by the driving unit of the spindle motor, the dynamic pressure is generated at the lubricating oil 6 of the respective locations by the radial dynamic pressure generating groove 7 in the radial direction and the thrust dynamic pressure generating groove 8 in the thrust direction. The hydrodynamic bearings (radial bearing and thrust bearing) allow the shaft 1 and the thrust flange 2 to be rotatably supported with respect to the sleeve 3 and the thrust plate 4 in a non-contacting manner while maintaining the micro-gap.

Figure 2:
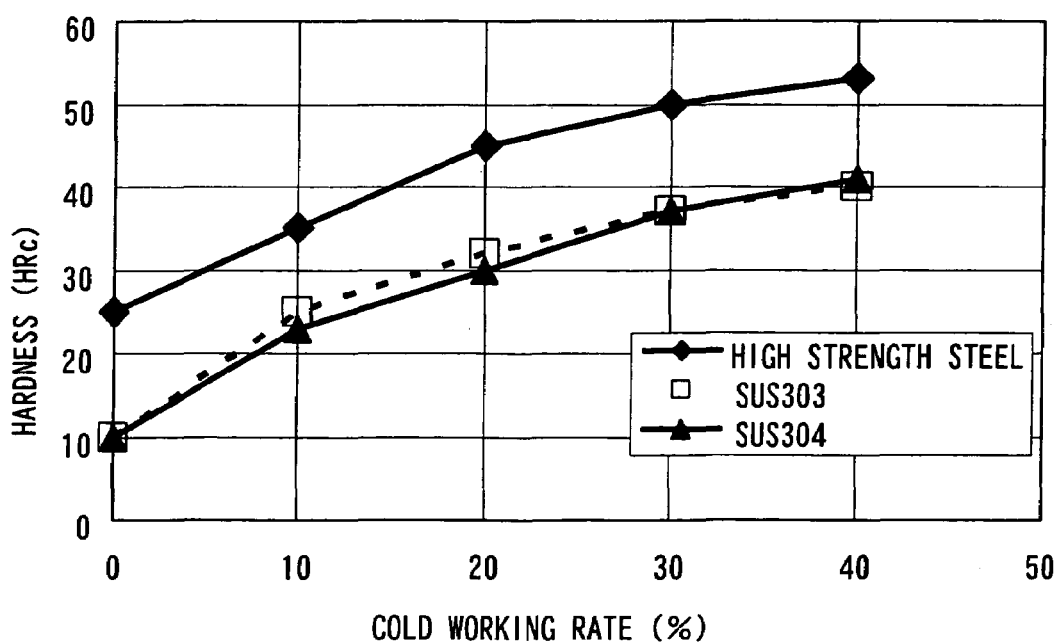
FIG. 2 is a correlation diagram of the cold working rate and the surface hardness of various materials.

The shaft 1 and the thrust flange 2 are formed using SUS 303, which is an austenite stainless. The shaft has a diameter of 3 mm and a length of 6 mm, and the thrust flange has a diameter of 4 mm and a thickness of 0.5 mm. The iron metal having austenite structure such as SUS 303 has a property that the surface hardness improves through cold working and has a correlation between the cold working rate and the hardness as shown in FIG. 2. Using such property, the SUS 303 in which the HRc is controlled to 10, 20, 30 and 40 is created, and molybdenum disulfide, one type of solid lubricant, is then sprayed to form the lubricating coated layers 13, 14, 15 on the outer peripheral surface of the shaft 1 and on the upper and lower surfaces of the thrust flange 2. The spraying condition is that the spray speed is 150 to 200 m/sec, the particle diameter of molybdenum disulfide is equal to or less than 50 µm, and the spraying time is 20 seconds. It is to be noted that the lubricating coated layer is a surface treated layer formed by dispersing the molybdenum disulfide over the surface of SUS 303.

When the molybdenum disulfide is sprayed and impacted with the SUS 303, temperature is increased near the surface of the molybdenum disulfide and the SUS 303. The element of the molybdenum disulfide is activated and adsorbed and diffused/permeated on the surface of the SUS 303, thereby forming the lubricating coated layers 13 to 15.

Figure 3:
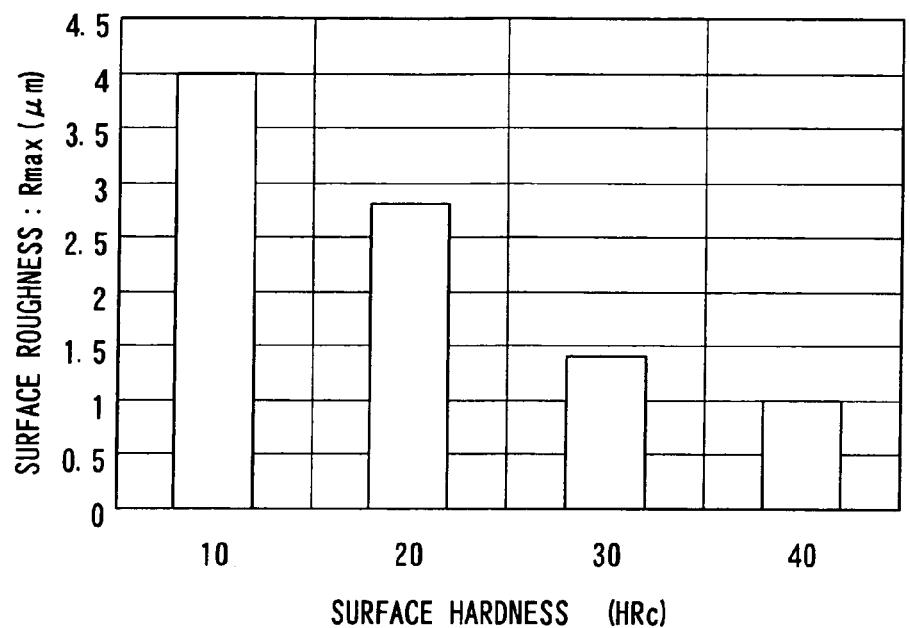
FIG. 3 is a correlation diagram of the surface hardness and the surface roughness.

FIG. 3 shows the correlation between the surface hardness and the surface roughness of the shaft 1 and the thrust flange 2 formed under the above conditions. The surface roughness before spraying is about 0.5 µm. As apparent from FIG. 3, as the surface hardness increases, the surface roughness decreases. This is because as the surface hardness becomes greater, the energy by spraying of particles is absorbed by a small plastic deformation, thereby suppressing the deformation of the surface. Therefore, the surface roughness can be controlled by the surface hardness.

Figure 4:
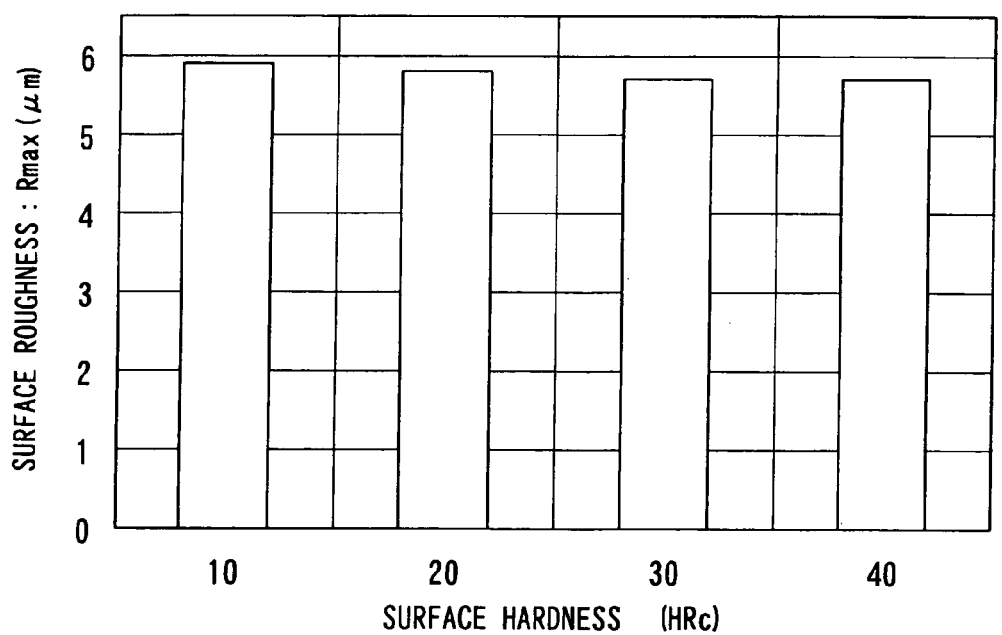
FIG. 4 is a correlation diagram of the surface hardness and the surface roughness.

FIG. 4 shows the result of when spraying is performed on the shaft of the same hardness under the condition (spray speed: 200 m/sec, particle diameter of molybdenum disulfide: equal to or less than 50 µm, particle diameter of parent layer metal Sn: 45 µm, spraying time: 15 sec) of Example 4 of the JP-A 2002-161371. As apparent from FIG. 4, change is barely found in the surface roughness even if the surface harness is changed, and the surface roughness is large compared to FIG. 3.

Figure 5:
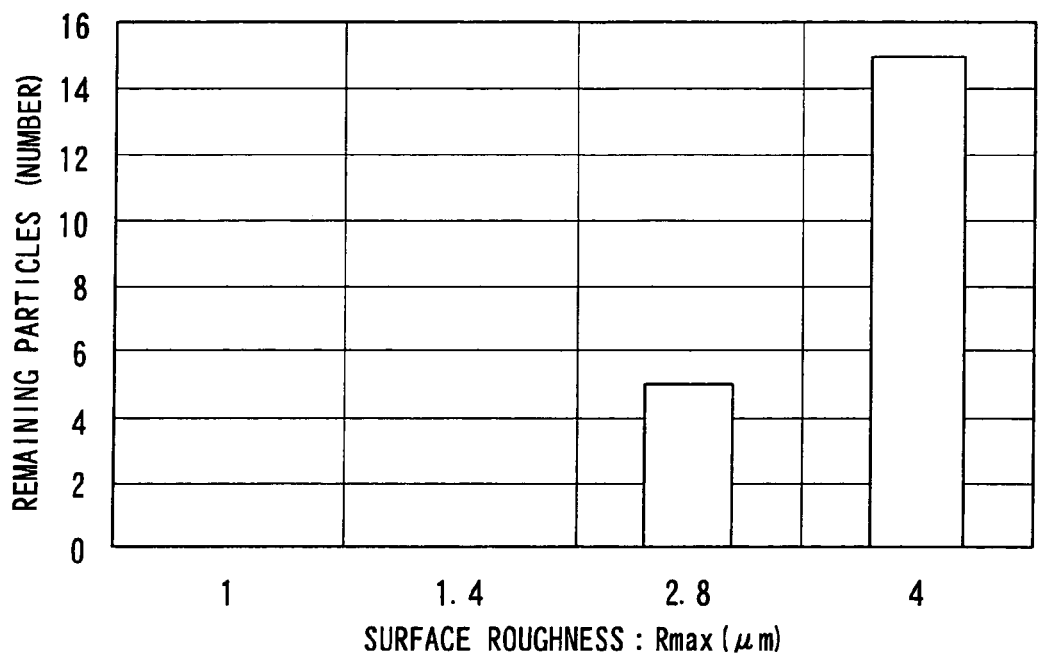
FIG. 5 is a correlation diagram of the surface roughness and the remaining particle.

Next, the shaft 1 and the flange 2 were placed in a 100 mL beaker with about 50 mL of acetone and cleaning was performed with an ultrasonic cleaner. The ultrasonic cleaner used was that having a frequency of 40 kHz, an output of 200 W, and a tank volume of 10 L, and the cleaning time was one minute. In order to investigate the remaining particles under such cleaning condition, a new acetone was used, cleaning was again performed at a cleaning time of 10 minutes, and the particles remaining in the acetone was measured using a particle counter. The result is shown in FIG. 5. As apparent from FIG. 5, no remaining particles were observed at the surface roughness of 1 μm and the surface roughness of 1.4 μm, but remaining particles were observed at the surface roughness of 2.8 μm and the surface roughness of 4 μm. This shows that sufficient cleaning is not performed. Therefore, cleanliness differed between the surface roughness and improvement of cleanliness is difficult with surface roughness of equal to or more than 2.8 μm.

Figure 6:
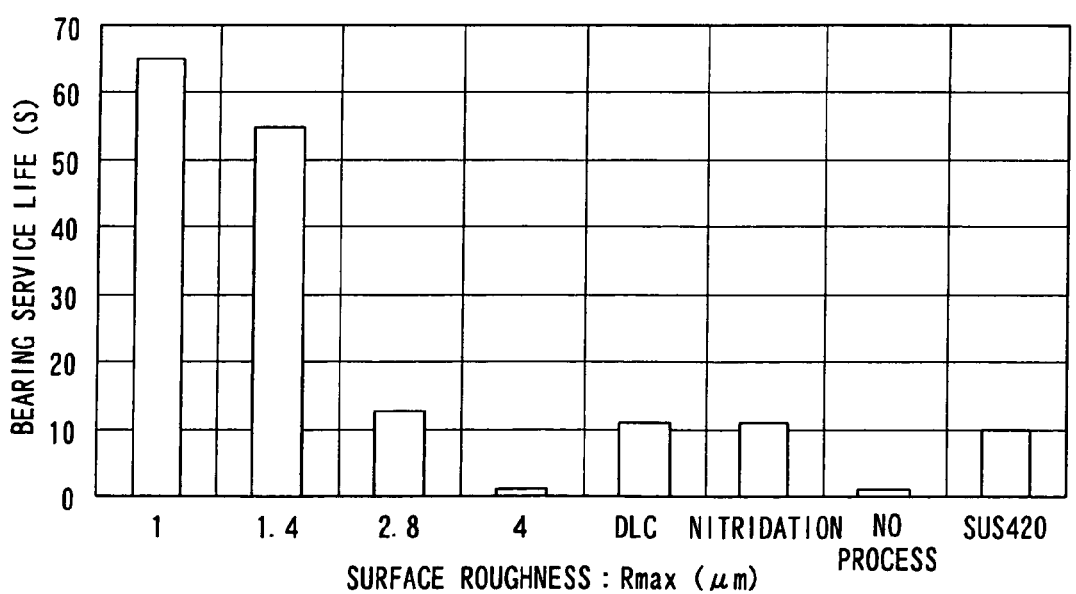
FIG. 6 is a correlation diagram of the surface roughness and the bearing service life.

Further, the bearing service life test was performed using the shaft 1 and the thrust flange 2 formed under the above condition, and the hydrodynamic bearing not performed with SUS 303, performed with nitridation, performed with DLC, and with conventionally used martensitic stainless SUS 420. In order to perform acceleration test in the service life test, the bearing was not filled with lubricating oil, and one side of the radial clearance of the bearing is formed at 4 μm and the thrust clearance of the bearing at 20 μm. The test conditions are that the orientation is shaft horizontal, the load is 30 g, and the rotation speed is 5400 rpm. The test result is shown in FIG. 6. As apparent from FIG. 6, the service life is rapidly reached if no process is performed or with a surface roughness of 4 μm, and the service life of that having surface roughness of 2.8 and performed with DLC and nitridation, and made of SUS 420 is reached in a time of about 10 seconds. On the other hand, when the surface roughness is 1 μm and the surface roughness is 1.4 μm, the service life is equal to or more than 50 seconds, and the service life is exponentially extended.

From the results of FIGS. 2 to 6, when, after forming the shaft and the thrust flange using the SUS 303 in which the surface hardness is made to equal to or more than 30 HRc through cold working, the fine particles of molybdenum disulfide are sprayed to form the surface treated layer including the lubricating coated layers 13 to 15, a hydrodynamic bearing device excelling in cleanliness and abrasion-resistance property and having high reliability can be formed.

Further, when polishing is performed for finishing when forming the shaft 1 and the thrust flange 2, the surface hardness is further improved by work hardening, and thus the surface roughness of when the fine particles of molybdenum disulfide are sprayed can be further reduced.

In this embodiment, the fine particles of molybdenum disulfide are sprayed, but only needs to be solid lubricant, and the lubricating coated layers 13 to 15 may be formed with tungsten disulfide or graphite.

The fine particle of the shaft material is included when collecting and reusing the sprayed solid lubricating material, but no change particularly in the surface roughness or cleanliness/service life is found, and thus can be reused without any problem.

In this embodiment, SUS 303 is used, but the material is not limited to SUS 303, and may be austenite stainless of SUS 304 and the like. Further, if the austenite high strength steel (AKS8000: made of Akiyama Seiko Co., Ltd. etc.) shown in FIG. 2 is used, 30 HRc is obtained even with low cold working rate of about 5%, and hardness exceeding 50 HRc is obtained if the cold working rate is equal to or more than 30%, and thus the surface roughness can be further reduced and is thus effective.

In this embodiment, the surface treated layer including the lubricating coated layers 13 to 15 are formed on the thrust flange in the thrust bearing, but the sleeve 3 and the thrust plate 4 may be formed with iron metal having austenite structure, and the surface treated layer including the lubricating coated layers 13 to 15 may be formed thereon.

In this embodiment, a hydrodynamic bearing spindle motor of a shaft rotating, inner rotor type is provided, but may be adapted to various bearing and motor shapes such as, of a shaft fixed, outer rotor type, and that in which the thrust bearing is formed with the sleeve 3 and the hub 9.

The bearing device and the spindle motor using the bearing device of the present invention may be used in HDD or polygon mirror, an optical disc device and the like.

What is claimed is:

1. A hydrodynamic bearing device comprising:
   a shaft,
   a sleeve arranged on an outer periphery of said shaft with a micro-gap therebetween,
   a dynamic pressure generating groove in at least one of opposing surfaces of said shaft and said sleeve, and
   a liquid operation fluid filled between said shaft and said sleeve, wherein
   said shaft comprises an iron metal having an austenite structure and a surface hardness equal to or more than HRc 30 with low cold working rate of equal to or more than 5%, a surface treated layer dispersed with solid lubricant on at least a part of the surface of said shaft facing said sleeve, and the surface roughness of said shaft having said surface treated layer is equal to or below 1.4 μm.

2. The hydrodynamic bearing device according to claim 1, wherein the sleeve is made of iron metal material or copper metal material.

3. The hydrodynamic bearing device according to claim 1, wherein the solid lubricant is any one of molybdenum disulfide, tungsten disulfide, and graphite.

4. A spindle motor comprising:
   the hydrodynamic bearing device according to claim 1, and
   a driving unit for supplying a rotation driving force between a shaft and a sleeve.

5. A manufacturing method for manufacturing the hydrodynamic bearing device according to claim 1, comprising:
   forming the surface treated layer by spraying fine particles of the solid lubricant.

6. The bearing manufacturing method according to claim 5, further comprising:
   forming the surface treated layer by spraying fine particles of the solid lubricant onto the iron metal having the austenite structure and having a surface hardness of equal to or more than HRc 30 after polishing.

7. A hydrodynamic bearing device comprising:
   a fixed member having a planar surface,
   a rotating member having a planar surface facing the planar surface of said fixed member with a micro-gap therebetween,
   a dynamic pressure generating groove in at least one of the planar surface of said fixed member and the planar surface of said rotating member, and
   a liquid operating fluid being between said fixed member and said rotating member, wherein
   at least one of said fixed member and said rotating member comprises an iron metal having an austenite structure and a surface hardness equal to or more than HRc 30 with low cold working rate of equal to or more than 5%, a surface treated layer dispersed with solid lubricant on at least a part of one of the planar surfaces of said fixed member and said rotating member, which comprises the iron metal having an austenite structure, and the surface roughness of said shaft having said surface treated layer is equal to or below 1.4 μm.

8. The hydrodynamic bearing device according to claim 7, wherein the solid lubricant is any one of molybdenum disulfide, tungsten disulfide, and graphite.

9. A spindle motor comprising: the hydrodynamic bearing device according to claim 7, and a driving unit for supplying a rotation driving force between a fixed member and a rotating member.

10. A method for manufacturing the hydrodynamic bearing device according to claim 7, comprising:
forming the surface treated layer by spraying the fine particles of the solid lubricant.

11. The bearing manufacturing method according to claim 10, further comprising:
forming the surface treated layer by spraying fine particles of the solid lubricant onto the iron metal having the austenite structure and having a surface hardness of equal to or more than HRc 30 after polishing.

* * * * *